No. 792,846. PATENTED JUNE 20, 1905.
S. D. POOLE.
LEVER MECHANISM FOR WHEELED PLOWS.
APPLICATION FILED DEC. 24, 1904.

Witnesses:

Inventor
Staley D. Poole
By
his Att'ys

No. 792,846.  
Patented June 20, 1905.

UNITED STATES PATENT OFFICE.

STALEY DANE POOLE, OF MOLINE, ILLINOIS, ASSIGNOR TO DEERE & CO., OF MOLINE, ILLINOIS, A CORPORATION OF ILLINOIS.

LEVER MECHANISM FOR WHEELED PLOWS.

SPECIFICATION forming part of Letters Patent No. 792,846, dated June 20, 1905.

Application filed December 24, 1904. Serial No. 238,442.

*To all whom it may concern:*

Be it known that I, STALEY DANE POOLE, a citizen of the United States, residing at Moline, in the county of Rock Island and State of Illinois, have invented certain new and useful Improvements in Lever Mechanism for Wheeled Plows; and I do hereby declare the following to be a full, clear, and exact description of the invention, such as will enable others skilled in the art to which it appertains to make and use the same.

This invention relates to lever-operated mechanism for lifting and depressing the plow or plows of a wheeled implement or riding, sulky, or gang plow, particularly one of that type in which the plow is attached to a plow-beam movably connected with the carrying-frame to permit its being raised and lowered with relation thereto.

The objects are to provide an improved, effective, and easily-handled lever mechanism of this character for raising the plow-beam, automatically locking it in elevated position, and lowering the beam and throwing the plow into the ground when released from its raised position, both the raising and lowering of the plow-beam being accomplished by a simple lever action without further trouble or attention on the part of the driver; to provide improved means for holding the plow in its working position and preventing accidental unlocking and rising out of the ground by reason of the jarring of the implement, and also to provide a convenient arrangement of foot-levers, one for lifting the plow-beam, the other for automatically locking it in elevated position and for releasing it by a kick or shove by the foot of the driver, and an auxiliary hand-lever adapted to be easily engaged with or disengaged from the operating mechanism for raising and lowering the plow-beam by hand, so that the control of the plow may be accomplished either by foot or hand, or both, at will.

In the accompanying drawings, which form a part of this specification, a wheeled plow is illustrated carrying a single furrow-opener, with levers, lifting and locking mechanism embodying my invention, which, however, is applicable to other implements either of single or gang type, as it is also susceptible of modification in details of construction and arrangement of parts.

Without limitation to the specific construction and embodiment shown the illustrated implement will be fully described for explanation of the invention, its principles and mode of application, and the invention will thereafter be particularly pointed out and defined in the claims following this description.

The letter A indicates the side bars of the frame, B the plow-beam, and C the plow attached thereto. The frame may be mounted upon suitable supporting-wheels, the usual land-wheel and front furrow-wheel being indicated by dotted lines in Fig. 6.

D denotes a U-shaped or equivalently-formed bail having its ends provided with spindles journaled in bearings in brackets E, pendent from the opposite frame-bars A, and having its medial portion journaled in a bracket-bearing F on a forward portion of the plow-beam. The beam-bail swings up and down as the plow-beam is raised and lowered and constitutes a crank, guiding the bracket-bearing F in an arc, which renders the manipulation of the plow easier, since the plow is moved forward and downward to penetrate into the soil and is carried backward and upward to elevate it instead of being lifted directly up through the earth.

Figure 4:
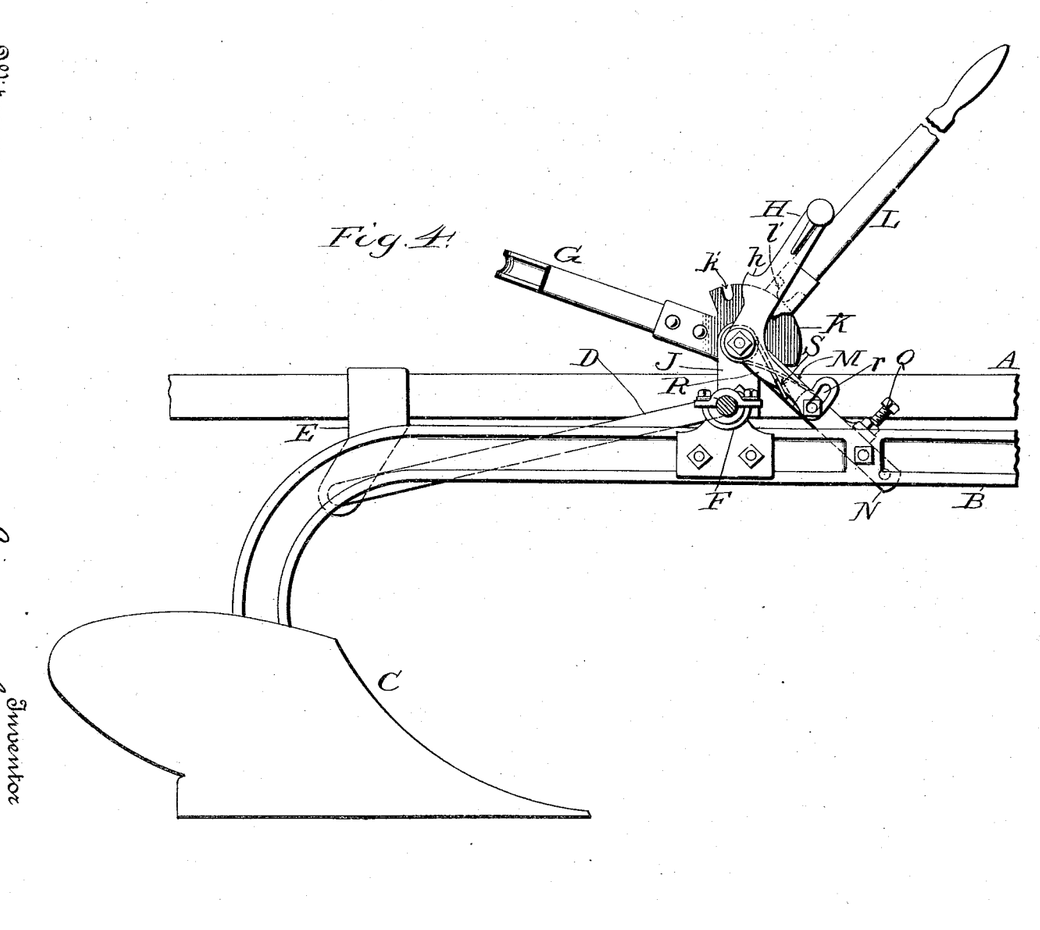
Fig. 4 is a side view similar to Fig. 1, but looking at the opposite side, also showing the plow-beam and plow in depressed position.
Figure 5:
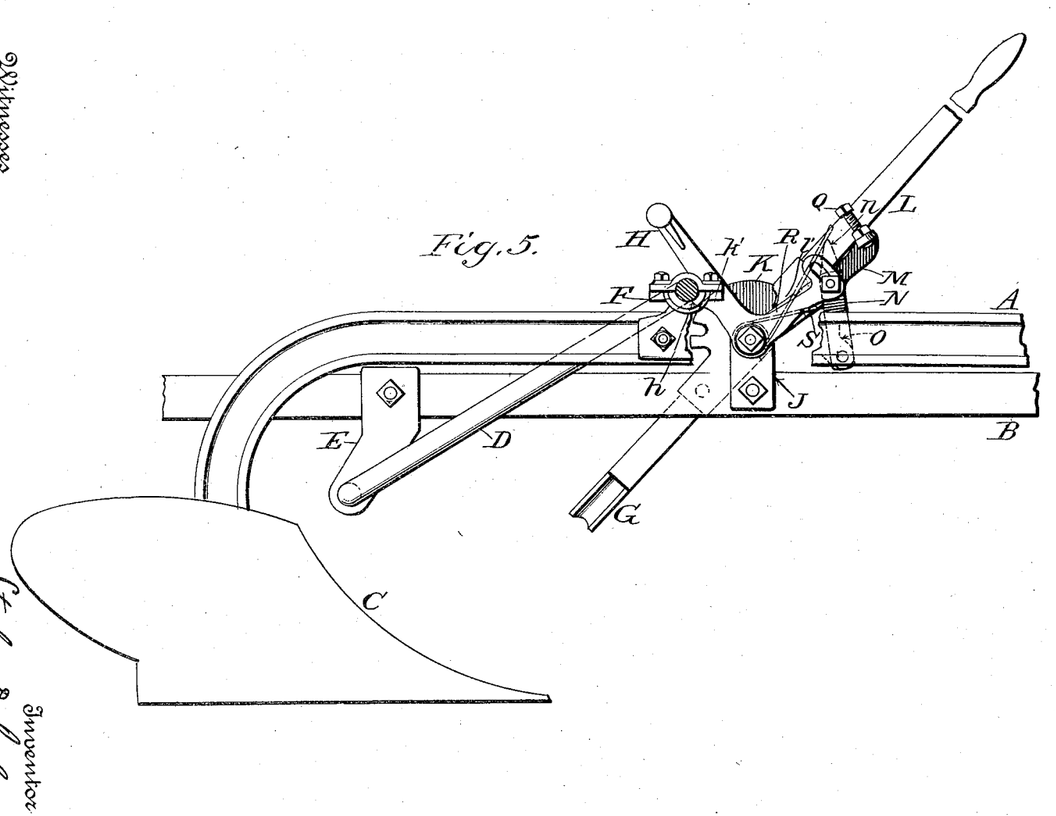
Fig. 5 is a side view similar to Fig. 4, but showing the plow-beam and plow in elevated position.
Figures 6, 7, 8, 9:
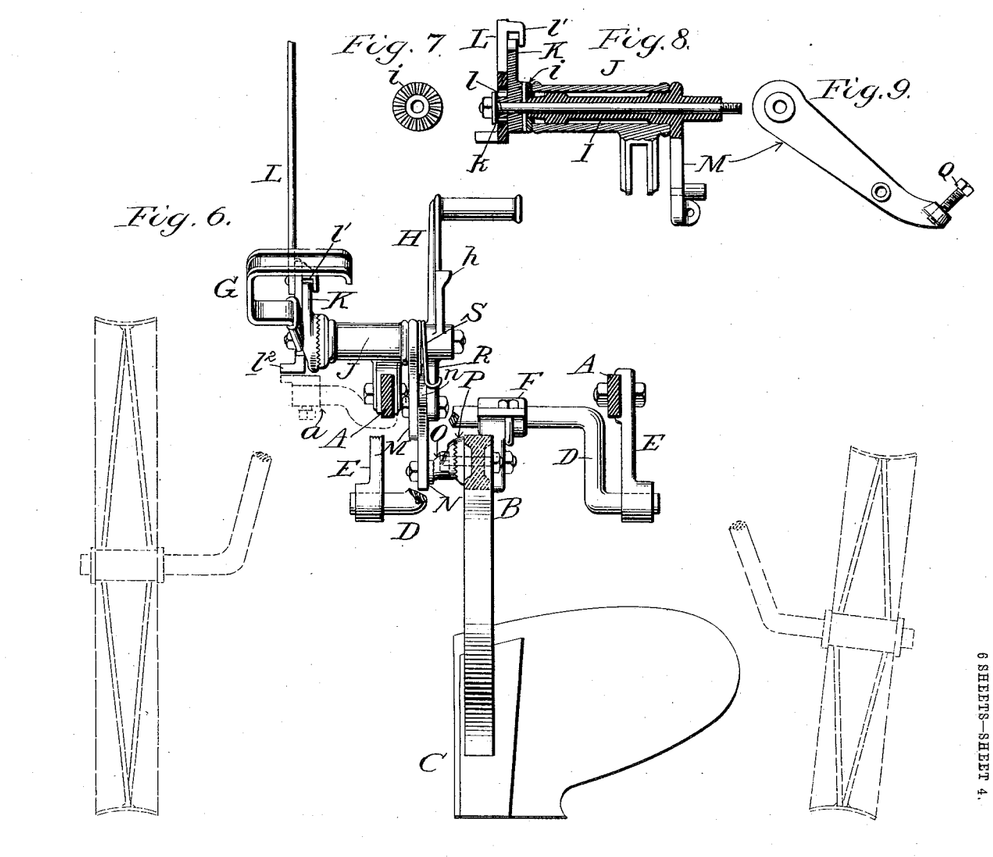
Fig. 6 is a transverse section through the plow-frame, showing the plow, levers, and mechanism in rear elevation.
Fig. 7 is a detail view of a corrugated washer.
Fig. 8 is a longitudinal section through the bearing and spindle of the levers.
Fig. 9 is a detail side view of a lever-arm rigid with said spindle.
Figure 10:
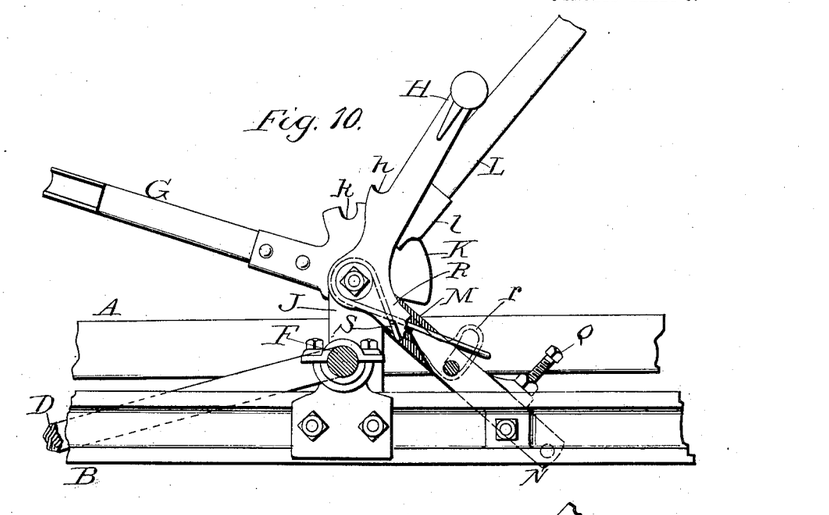
Fig. 10 is an enlarged side view of the lever mechanism in the position shown in Fig. 4.
Figures 11, 12:
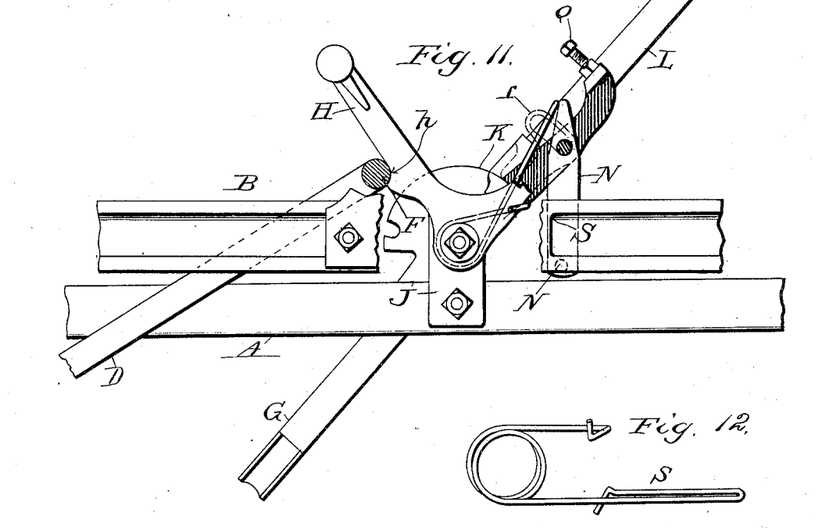
Fig. 11 is a similar view of said mechanism in the position shown in Fig. 5.
Fig. 12 is an enlarged detail view of a spring used as part of the locking mechanism.

G and H are foot-levers attached to opposite ends of a transverse spindle I, Fig. 8, which is journaled in a bracket-bearing J on the frame A or one of its side bars. These foot-levers are arranged at an angle to each other, as appears from Figs. 1, 4, and 5. The rear one, G, is depressed for elevating the plow-beam, and the front one, H, is kicked or shoved forward for unlocking the plow-beam from raised position and lowering the plow into the ground.

The angular relation between the foot-levers can be changed by adjusting lever G with respect to spindle I. To facilitate this adjustment, a corrugated washer $i$, Figs. 6, 7, and 8, is shown arranged between the end of said spindle and a corrugated face on lever G, or rather on a segment K, to which said lever is rigidly attached. The said spindle and foot-levers when adjusted in desired relation are all connected rigidly together by a bolt passing axially through them, as shown in Fig. 8.

Figures 1, 2, 3:
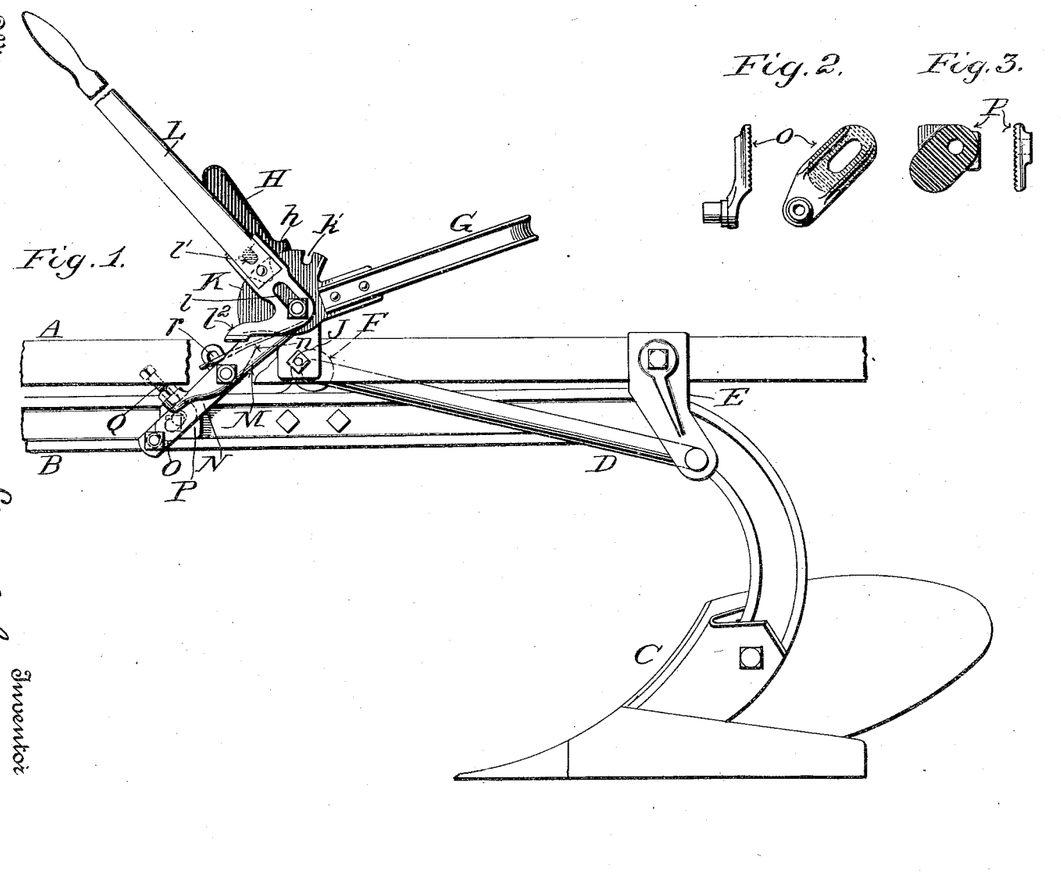
Figure 1 is a fragmentary side elevation of the implement, showing one of the sides of the plow-frame, the plow and its plow-beam in depressed position, and lever-operated mechanism therefor embodying my invention.
Figs. 2 and 3 are detail views of two parts attached to the plow-beam and forming part of the controlling mechanism.

L denotes a hand-lever loosely connected to spindle I, having in its lower end a slot $l$, inclosing a projection or axial boss $k$ on segment K, Figs. 1 and 8, and having a tooth $l'$, adapted to engage by gravity a notch $k'$ in the periphery or arc edge of said segment when the hand-lever is pulled backward to permit its hook to drop into said notch. When thus locked together, the movements back and forth of the hand-lever will carry with it the segment K, spindle I, and foot-levers G and H. By virtue of its pin-and-slot connection with segment K the hand-lever can be lifted so as to disengage its tooth $l'$ from notch $k'$, and it may be allowed to fall forward out of the way of the driver, as illustrated in the different views, particularly Fig. 1. In this position the hand-lever may be supported by means of an arm $l^2$ thereof resting on a stop $a$, connected to the plow-frame. It is thus seen that the hand-lever is an auxiliary to the foot-levers and that the functions of lifting the plow out of the ground and depressing it may be accomplished either by the foot-levers or by the hand-lever when locked with the segment K, the movements of the plow-beam being performed by the mechanism or connections now to be described. The said connection between the levers and plow-beam is accomplished in the illustrated embodiment by a compound lever composed of three parts M N O. M is a lever-arm rigid or integral with spindle I. It moves with said spindle as the latter is rocked by any one of the levers G, H, or L, thus constituting a crank-arm. O is an arm or bracket rigidly attached to the side of the plow-beam, preferably having a corrugated face and held against a corrugated plate or washer P, directly attached to the beam, Figs. 1, 2, and 3, and having a slot to receive the clamping-bolt and permit adjustment of the arm O along a diagonal line, which is for the purpose of obtaining the desired relation of parts. N is an intermediate link pivotally connecting the crank-arm M and arm or bracket O, thus forming a connection between the crank-arm and the plow-beam. The arrangement of these parts is such that when the plow-beam is released from its elevated position and lowered to force the plow into the ground the crank-arm M and link N come practically into line with each other, and by means of a stop limiting the downward movement of the crank-arm the parts stop in position with their pivotal connecting-bolt on or past a dead-center, so as to lock the plow firmly to its work in the ground. An efficient stop for this purpose is provided by a set-screw Q, tapped through an offset on the crank-arm and adapted to bear against the link when the plow-beam is lowered, this set-screw being conveniently adjustable for limiting the relative movement of M and N as desired. Pressing down upon the foot-lever G or pulling back the hand-lever L if it is engaged with segment K unlocks this connection and lifts the plow-beam by leverage connections M N O, as illustrated in Fig. 5.

During working of the plow in the ground the jarring of the parts has a tendency to shake or throw the link N up and away from its dead-center, and thus might unlock the mechanism and permit the plow to come up out of the ground. To avoid this, the upper end of the link N has a wedge-shaped extension $n$ above its pivotal connection to the lever M, and one arm of a bibranched spring S bears down upon the upper slanting side of said extension when the plow is in the ground, and thus keeps the pivot-bolt connecting M and N on or below a dead-center and insures against unlocking of the parts by jarring or vibration. The spring S here referred to is preferably of stout steel wire, coiled around the bearing J and having crossed spring-arms, the shorter one of which is shown engaging under the bell-crank arm R, hereinafter referred to, while the longer one bears upon the wedge $n$, as aforesaid. When the plow is raised to elevated position, the longer arm of the spring bears against the opposite side of the wedge and takes up any lost motion that may exist.

To automatically lock and hold the plow-beam in its elevated position, the foot-lever H has at its rear side an offset or shoulder $h$, which serves as a trigger-lock and engages under the bail D as the plow-beam comes to its highest position. Said foot-lever H has been referred to as attached to spindle I; but this attachment is not perfectly rigid, but such as to permit a limited independent movement of said lever on its spindle. Said lever is shown loosely pivoted on its spindle and has a bell-crank arm R with an arc-slot $r$ engaged by a stud on the crank-arm M or by the pivotal bolt connecting M and N, Figs. 4 and 5. By means of spring S said foot-lever is held yieldingly rearward to the limit permitted by the arc-slot. As the plow-beam is raised the catch $h$ strikes the bail D, but is permitted to pass it because of the yielding of the spring S and once past the spring throws said catch $h$ under the bail and locks it. When in this position, as shown in Fig. 5, the plow-beam is unlocked or released and allowed to fall simply by pushing forward with the foot the foot-lever H or by pushing forward the hand-lever L if it is engaged with the segment K, as previously described.

Figure 13:
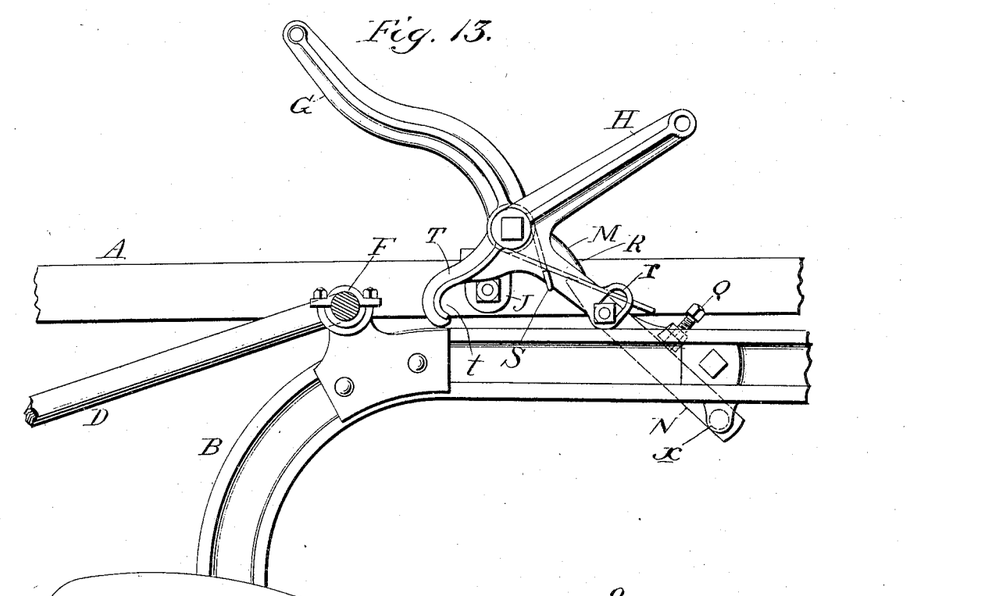
Figs. 13 and 14 are views similar to Figs. 9 and 10, showing a modification.
Figure 14:
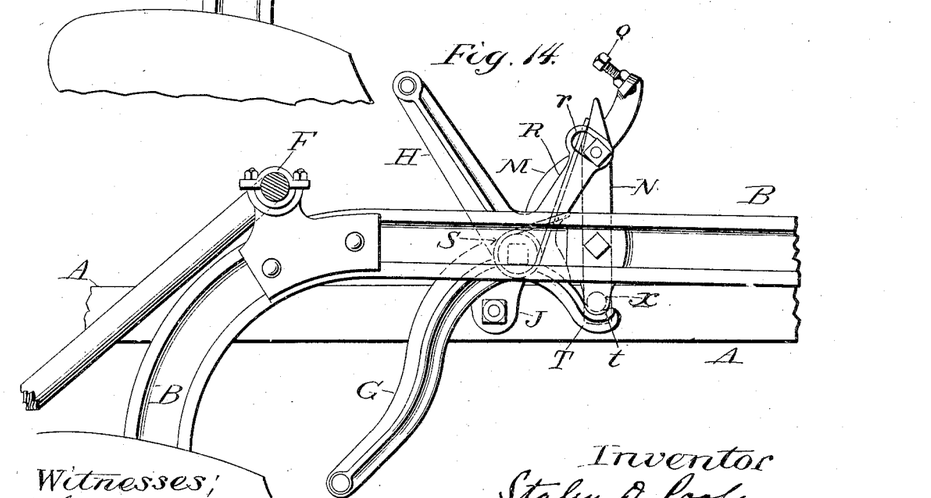

Other means may be provided for holding the plow-beam in elevated position, as by supporting one of the other parts connected with the plow-beam rather than the bail. The construction thus far described is used on ordinary or gang plows. For a sulky-plow I preferably employ a device such as shown in Figs. 13 and 14, in which the lever H has an arm T extending below its pivot and formed with a "hang-up" hook $t$. When the lever G is depressed for elevating the plow, the lever H of course moves backward and the hang-up hook engages under the pivotal bolt or bearing $x$ between the parts N and O, thus holding the plow-beam in its elevated position. Where this device is used, the offset or catch $h$ at the back of lever H may be omitted, or both means may be employed in combination.

Assuming the plow-beam to be in elevated position, it is easily released by a forward kick of the driver on the foot-lever H or by pushing forward on the hand-lever J when engaged with segment K, allowing the plow to fall or plunge downward and forward to penetrate into the soil, assisted by the pull of the team hitched to the plow-beam, though the depression may be positively effected by forward pressure upon the foot-lever or hand-lever. In coming to such lower position the crank-arm M and link N straighten and lock with their pivotal connecting-bolt approximately on or past a dead-center, thus holding the plow firmly to its work in the ground, as previously described. This connection may be unlocked and the plow-beam raised by pressing down with the foot upon the foot-lever G or pulling back upon the hand-lever L if it is engaged with the segment K, and thus raising the front part of the bail D past the catch or trigger-lock $h$, which by virtue of the spring S snaps under the bail and locks the plow in its elevated position. Thus the mechanism or system of leverages is very simple and effective in operation and permits the plow to be handled easily either by foot or hand.

By the use of the word "plow" in the claims it is intended to refer to the whole part to be raised and lowered, either the plow as a whole or the beam or standard for its attachment, and also to cover the use of a plurality of plows or beams or standards where the invention is applied to a gang-plow.

I claim as my invention and desire to secure by Letters Patent of the United States—

1. A wheeled plow having, in combination, a plow-beam movably connected with the carrying-frame to permit its being raised and lowered with relation thereto, and lever-operated mechanism including a lifting-lever connected with the plow-beam and adapted to raise and automatically lock it in elevated position and adapted to release and lower the plow-beam by moving said lever in the opposite direction.

2. A wheeled plow having, in combination, a plow-beam supported so as to be raised and lowered with relation to its carrying-frame, a lifting-lever, connections between it and the beam for lifting the latter by said lever, and a catch movable with said lever adapted to engage a part carried by the beam as the latter is raised and to lock it in such elevated position and adapted to release the beam either by being pushed directly out of such engagement or by a reverse movement of the lever.

3. A wheeled plow having, in combination, a carrying-frame, a movable plow-beam, a bail pivotally connecting the beam and frame permitting the beam to be raised and lowered, a lifting-lever, connections between it and the beam for raising said beam by said lever, and a swinging arm or lever on the fulcrum or spindle of said lifting-lever having a catch which engages under the bail as the beam comes to raised position and sustains it in such position.

4. A wheeled plow having, in combination, a carrying-frame, a plow movably supported so as to be raised and lowered with relation to the frame, a lifting-lever, and mechanism operated thereby for lifting the plow and having provision for automatically locking it in elevated position, and means for releasing and lowering the plow by moving said lever in a reverse direction.

5. A wheeled plow having, in combination, a carrying-frame, a plow movably supported so as to be raised and lowered with relation to the frame, a spindle journaled in a bearing on said frame having a lifting-lever and a crank-arm connected with the plow for raising the same, and means for automatically locking the plow in elevated position which can be disengaged to release the plow by a reverse movement of the lifting-lever.

6. A wheeled plow having, in combination, a carrying-frame, a plow movably supported so as to be raised and lowered with relation to the frame, a spindle journaled in a bearing on said frame having a lifting-lever and a crank-arm connected with the plow for raising the same by moving said lever in one direction, means for automatically locking the plow in elevated position, and a foot-lever fulcrumed on said spindle for disengaging said locking means and lowering the plow.

7. A wheeled plow having, in combination, a carrying-frame, a plow movably supported so as to be raised and lowered with relation to the frame, a spindle journaled in a bearing on said frame having a lifting-lever and a crank-arm connected with the plow for raising the same, and an arm or lever fulcrumed on said spindle having means for automatically locking the plow in elevated position and adapted to release the plow by being pushed forward or in an opposite direction to the lifting movement of the lever.

8. A wheeled plow having, in combination, a carrying-frame, a plow movably supported so as to be raised and lowered with relation to the frame, a spindle journaled in a bearing on said frame having a lifting-lever and a crank-arm connected with the plow for raising the same, a spring-resisted foot-lever fulcrumed on said spindle and capable of a slight limited turn thereon, and a catch or trigger lock operated by said foot-lever adapted to lock the plow in its elevated position.

9. A wheeled plow having, in combination, a carrying-frame, a plow movably supported so as to be raised and lowered with relation to the frame, a spindle journaled in a bearing on the frame having a lifting-lever at one end and a crank-arm at the other connected with the plow for raising it by said lever, a bell-crank lever loosely mounted on said spindle having an arc-slot in one arm engaged by a stud on said crank-arm, a spring holding said bell-crank lever to the limit of movement permitted by said arc-slot, and a catch or trigger lock operated by said spring-resisted bell-crank lever for automatically locking the plow in its elevated position.

10. A wheeled plow having, in combination, a carrying-frame, a plow-beam, a bail pivotally connecting the frame and beam allowing the latter to be raised and lowered with relation to the frame, a spindle journaled in a bearing on the frame, a lifting-lever secured thereto, a crank-arm rigid on said spindle having suitable connections with the beam for lifting it by said lifting-lever, and another lever attached to said spindle and capable of a slight turn thereon and spring-held in one direction, said second lever having a rear notch or shoulder adapted to snap past the bail as the beam comes to its highest point and then to engage under said bail and thus hold the plow in elevated position.

11. A wheeled plow having, in combination, a carrying-frame, a plow-beam held so as to be raised and lowered with relation thereto, a lifting-lever fulcrumed on the frame, a compound lever connecting said lifting-lever and beam comprising a crank-arm rigid with the fulcrum of the lifting-lever and an arm on the beam and a link pivotally connecting them, and means stopping said crank-arm and link with their pivotal connecting-bolt approximately on or past a dead-center, as the beam is lowered to lock the plow in working position in the ground.

12. A wheeled plow having, in combination, a carrying-frame, a plow-beam held so as to be raised and lowered with relation thereto, a lifting-lever fulcrumed on the frame, a compound lever connecting said lifting-lever and beam comprising a crank-arm rigid with the fulcrum portion of the lifting-lever and an arm on the beam and a link pivotally connecting them, the link and crank-arm being arranged to stop in line with each other when the plow is lowered, and said arm on the beam being adjustable along a diagonal line in a vertical plane to secure desired relation of parts.

13. A wheeled plow having, in combination, a carrying-frame, a plow-beam movably held so as to be raised and lowered with relation thereto, a lifting-lever fulcrumed on the frame, a crank-arm rigid with the fulcrum portion of said lever, a link pivotally connecting said crank-arm with the beam, the crank-arm and link being arranged to come into line as the beam is lowered, a set-screw tapped through an offset on the crank-arm adapted to abut the link and limit the movements of these two parts as said beam is lowered, and a spring acting upon said link for yieldingly holding the parts locked when the plow is depressed.

14. A wheeled plow having, in combination, a carrying-frame, a plow movably supported so as to be raised and lowered with relation to the frame, a lifting-lever fulcrumed on the frame, connections between it and the plow for raising the latter by said lever, and a foot-lever attached on the same fulcrum or spindle as the other for lowering the plow by a reverse movement.

15. A wheeled plow having, in combination, a carrying-frame, a plow movably supported so as to be raised and lowered, a spindle journaled in a bearing on the frame, two foot-levers attached to said spindle at an angle to each other, and lifting connections between said levers and the plow, the rear foot-lever serving to raise the plow when depressed, and the front foot-lever serving to lower the plow when pushed forward.

16. A wheeled plow having, in combination, a carrying-frame, a plow movably supported so as to be raised and lowered, two foot-levers arranged at an angle and having a common fulcrum on the frame and movable in unison, lifting connections between said levers and the plow, the rear one of said foot-levers serving when depressed to lift the plow, automatic means for locking the plow in elevated position, and the other foot-lever serving when pushed forward by the driver's foot to unlock the plow and allow it to lower.

17. A wheeled plow having, in combination, a plow adapted to be raised and lowered with relation to the carrying-frame, a foot-lever connected therewith for lifting the plow, and a hand-lever adapted to be operatively engaged with and disengaged from the fulcrum of said foot-lever for lifting the plow by hand when desired.

18. A wheeled plow having, in combination, a plow adapted to be raised and lowered with relation to the carrying-frame, lifting means, two foot-levers arranged at an angle to each other on the same fulcrum for moving in unison and connected to said lifting means, one for operating said means to raise the plow and the other to lower the plow by a reverse movement, and an auxiliary hand-lever adapted to be engaged with said lifting means for controlling the plow by hand.

19. A lever construction for wheeled plows and similar implements comprising a spindle having angularly-arranged foot-levers secured thereto and provided with a crank-arm for connection with the member to be raised and lowered, one of said foot-levers adapted for raising the plow and the other for lowering it by a reverse movement, a notched segment rigid with said spindle, and a hand-lever having a pin-and-slot connection with said segment and having a tooth which can engage the notched segment by gravity or be lifted out of engagement by virtue of its said pin-and-slot connection.

20. In a lever construction for wheeled plows, a lifting-lever and a reversing-lever arranged at an angle and both secured to the same spindle, one of said levers having a corrugated inner face at its fulcrum portion, and a corrugated washer interposed between said face and the fulcrum portion of the other lever, all being clamped together by a fastening-bolt, permitting angular adjustment of the levers.

21. A wheeled plow having, in combination, a carrying-frame, a movable plow-beam, a bail pivotally connecting the frame and beam for permitting raising and lowering of the latter, a lever fulcrumed on the frame, mechanism for lifting said beam by said lever, a spring-catch or trigger-lock adapted to snap under the bail when the beam is raised and hold it in elevated position, and means for disengaging said catch to release the bail and allow lowering of the beam.

22. The combination with a wheeled supporting-frame, of a plow-beam movably sustained thereby to allow raising and lowering of the beam, a bail pivotally connecting the frame and beam, means for lifting the beam, and a spring-actuated foot-lever having a notch adapted to catch under the bail when the beam is raised for locking it in elevated position.

23. The combination of the link N with its wedge-shaped extension and a spring engaging the same, substantially as described.

24. A wheeled plow having, in combination, a carrying-frame, a movable plow-beam, a bail pivotally connecting the frame and beam to allow raising and lowering of the latter, a lifting-lever fulcrumed on the frame and connected with the beam for raising it, a foot-lever attached to the fulcrum of said lifting-lever to turn with the latter but capable of a slight independent oscillation, a spring yieldingly holding said foot-lever to the limit of its independent movement in one direction, and a hold-up device carried by said foot-lever adapted to engage a part carried by the beam and thereby sustain the latter when elevated, movement of said foot-lever against resistance of said spring serving to disengage said hold-up device and allow lowering of the beam.

25. A wheeled plow having, in combination, a carrying-frame, a movable plow-beam, a bail pivotally connecting the frame and beam to allow raising and lowering of the latter, a lifting-lever fulcrumed on the frame and connected with the beam for raising it, a secondary lever attached to the fulcrum of said lifting-lever to turn with the latter but capable of a similar independent oscillation, said secondary lever being spring-forced in one direction and having a notch or shoulder adapted by virtue of the yielding and reaction of the spring to engage or snap under the swinging end of the bail as the beam is elevated.

26. A wheeled plow having, in combination, a movable plow-beam, a bail pivotally connecting the frame and beam allowing raising and lowering of the latter, a lifting-lever fulcrumed to the frame having a crank-arm connected with the beam for raising it by said lever, a cofulcrumed foot-lever having an arm connected to the crank-arm by a bolt-and-slot connection allowing a limited independent oscillation of said foot-lever, a spring holding said foot-lever yieldingly to the limit in one direction permitted by said connection, and a shoulder or offset on said foot-lever adapted by virtue of said spring and connection to serve as a trigger-lock and engage under the bail when the beam is brought to elevated position.

27. A wheeled plow having, in combination, a carrying-frame, a movable plow-frame, a lifting-lever having a crank-arm connected to the beam for raising it by said lever, a cofulcrumed foot-lever having an arm connected with said crank-arm by a bolt-and-slot connection allowing a limited independent oscillation of said foot-lever, a spring actuating said foot-lever in one direction, and a hold-up device automatically operated by said foot-lever for sustaining the beam in its elevated position and adapted to release the same and allow lowering thereof by forcing said foot-lever against its spring.

28. A wheeled plow having, in combination, a carrying-frame, a movable plow-beam, a lifting-lever fulcrumed on the frame having a crank-arm, a link pivotally connecting said crank-arm and beam, the crank-arm and link being arranged to come into line as the beam is lowered, means for effecting a dead-center lock between said link and crank-arm when the beam is lowered, the link having a wedge-shaped end, and a spring attached on the fulcrum of said lifting-lever having oppositely-sprung arms acting on the opposite inclined faces of said wedge-shaped end.

In testimony whereof I affix my signature in presence of two witnesses.

STALEY DANE POOLE.

Witnesses:
 CHARLES H. POPE,
 FRED H. COOPER.